(12) United States Patent
Jasper et al.

(10) Patent No.: US 6,396,825 B1
(45) Date of Patent: May 28, 2002

(54) METHOD AND APPARATUS FOR USING A PSEUDO-RANDOM SIGNAL IN A COMMUNICATION SYSTEM

(75) Inventors: Steven C. Jasper, Hoffman Estates; Mark A. Birchler, Roselle; Debra A. Jones; Nicholas C. Oros, both of Schaumburg, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/339,416

(22) Filed: Jun. 24, 1999

Related U.S. Application Data

(60) Provisional application No. 60/097,010, filed on Aug. 18, 1998.

(51) Int. Cl.[7] ............................................ H04J 3/00
(52) U.S. Cl. .................. 370/336; 370/345; 370/522; 455/455; 455/516
(58) Field of Search .................. 370/328, 329, 370/331, 332, 335, 336, 337, 342, 345–347, 350, 522, 464; 375/131; 455/466, 434, 422, 450–452, 455–457, 516, 517, 524, 501, 507, 509; 342/450, 463

(56) References Cited

U.S. PATENT DOCUMENTS

| | | | | |
|---|---|---|---|---|
| 5,323,447 A | * | 6/1994 | Gillis et al. ................... | 455/464 |
| 5,638,361 A | * | 6/1997 | Ohlson ......................... | 370/342 |
| 5,696,762 A | * | 12/1997 | Natali et al. ................. | 370/320 |
| 5,715,240 A | * | 2/1998 | Borras et al. ................ | 370/332 |
| 5,809,417 A | * | 9/1998 | Nealon et al. ............... | 455/426 |
| 5,896,560 A | * | 4/1999 | Pfiefer et al. ................ | 455/515 |
| 5,898,929 A | * | 4/1999 | Haartsen ...................... | 370/340 |
| 5,909,651 A | * | 6/1999 | Chander et al. ............. | 370/432 |
| 5,987,020 A | * | 11/1999 | Abe ............................ | 370/347 |
| 6,047,192 A | * | 4/2000 | Malony et al. .............. | 455/456 |
| 6,101,178 A | * | 8/2000 | Beal ............................ | 370/336 |
| 6,157,842 A | * | 12/2000 | Karlsson et al. ............ | 455/456 |
| 6,201,830 B1 | * | 3/2001 | Chellali et al. .............. | 370/287 |

* cited by examiner

Primary Examiner—Seema S. Rao
(74) Attorney, Agent, or Firm—Jeffrey K. Jacobs

(57) ABSTRACT

A base site (104) generates a pseudo-random signal based on at least one system parameter known to both the base site and a communication unit (112). The base site (104) then transmits the pseudo-random signal to the communication unit via an idle communication resource (102). Upon receiving the pseudo-random signal, the communication unit (112) determines at least one characteristic of the idle communication resource (102) using the pseudo-random signal.

11 Claims, 3 Drawing Sheets

US 6,396,825 B1

METHOD AND APPARATUS FOR USING A PSEUDO-RANDOM SIGNAL IN A COMMUNICATION SYSTEM

The present application is based on prior U.S. application No. 60/097,010, filed on Aug. 18, 1998, which is hereby incorporated by reference, and priority thereto for common subject matter is hereby claimed.

FIELD OF THE INVENTION

The present invention relates generally to communication systems and, in particular, to using a pseudo-random signal to determine one or more characteristics of a communication resource within a communication system.

BACKGROUND OF THE INVENTION

In wireless communication systems today, sending devices are known to transmit to receiving devices predefined signals which are known to the receiving devices. Using such signals, receiving devices make signal quality measurements and perform location determination. A receiving device can compare a received signal to an expected signal and, thus, determine the quality of the received signal. Global positioning system (GPS) satellites continuously transmit known signals for the purpose of location determination by receiving devices. Each GPS satellite transmits a pseudo-random signal generated from a unique pseudo-random sequence. Receiving devices, equipped to predict and identify the pseudo-random sequence of each satellite, receive signals from multiple satellites. Location determination of the receiving devices can then be performed based on the location of each satellite and the delay of the received signal from each satellite.

Wireless communication systems such as cellular systems and two-way radio systems have limited communication bandwidth with which to provide multiple communication services to users. Signal quality measurement and location determination are useful capabilities for wireless communication systems in general. Communication units within such systems make signal quality measurements in an attempt to more efficiently utilize the limited communication bandwidth. And the ability of a communication unit to determine its own location is useful particularly in emergency situations. Transmitting known signals to communication units for signal quality measurement or location determination requires a portion of the limited communication bandwidth, however. In communication systems today, therefore, the allocation of limited communication bandwidth to such signals either has the effect of reducing system capacity or degrading communication services in use.

Therefore, a need exists for an apparatus and method that uses signals known to both the sending and receiving devices for such purposes as measuring signal quality and determining location, whereby system capacity is not reduced and communication services are not degraded.

DESCRIPTION OF A PREFERRED EMBODIMENT

Generally, the present invention provides a method and apparatus for using a pseudo-random signal in a communication system. A base site generates a pseudo-random signal based on at least one system parameter known to both the base site and a communication unit. The base site then transmits the pseudo-random signal to the communication unit via an idle communication resource. Upon receiving the pseudo-random signal, the communication unit determines at least one characteristic of the idle communication resource using the pseudo-random signal. A time of arrival for location determination could be one such characteristic, for example.

By transmitting the pseudo-random signal to the communication unit via an idle communication resource, the present invention allows the transmission of known signals to occur without reducing system capacity or degrading service. In communication systems with limited communication resources, a particular communication resource which is otherwise allocated for conveying information may occasionally not be allocated. Such an unallocated communication resource is considered idle while not allocated to convey information. Because only idle communication resources are used to convey the pseudo-random signals, no information traffic is displaced and, thus, system capacity and communication services are unaffected.

Figure 1:
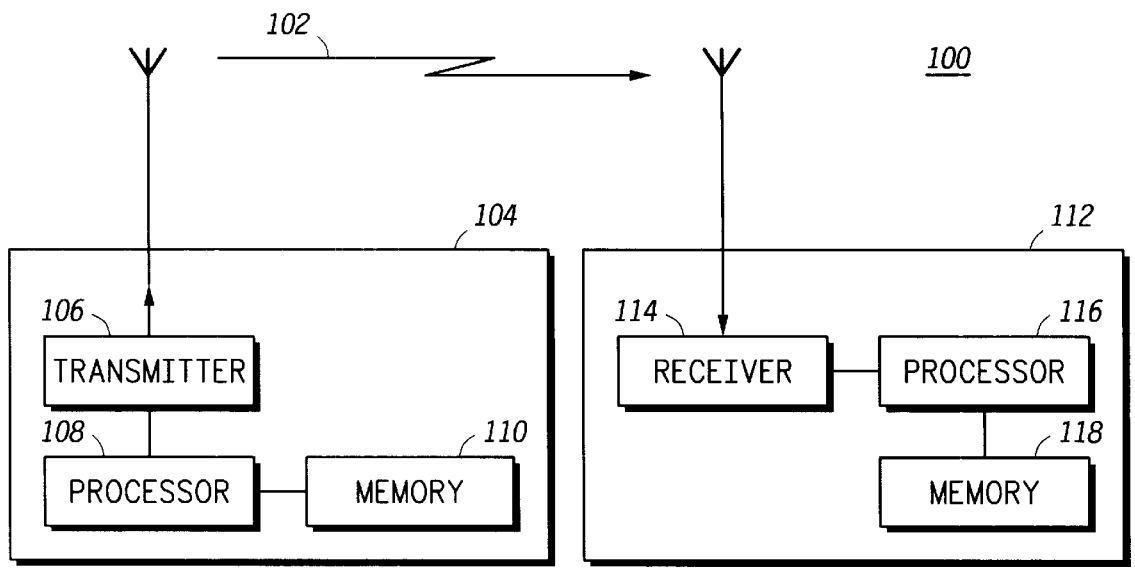
FIG. 1 illustrates a block diagram depiction of a communication system in accordance with a preferred embodiment of the present invention.

The present invention can be more fully understood with reference to FIGS. 1–5. FIG. 1 illustrates a block diagram depiction of a communication system 100 in accordance with a preferred embodiment of the present invention. The base site 104 comprises a transmitter 106, a processor 108, and a memory 110. The communication unit 112 comprises a receiver 114, a processor 116, and a memory 118. The transmitter 106 preferably comprises conventional circuitry operated and controlled by routinely developed software, such as that used in amplifiers, modulators, upconverters, and filters. The receiver 114 preferably comprises conventional circuitry operated and controlled by routinely developed software, such as that used in amplifiers, demodulators, down-converters, and filters. Each processor 108, 116 preferably comprises a portion of a multi-function digital signal processor (DSP), and each memory 110, 118 preferably comprises a random access memory that stores the same set of one or more system parameters. The base site 104 preferably comprises a "Motorola iDEN" base radio that is commercially available from Motorola, Inc. of Schaumburg, Ill. The communication unit 112 preferably comprises one of the "Motorola iDEN" handsets also commercially available from Motorola, Inc. of Schaumburg, Ill.

Operation of the preferred communication system 100 occurs substantially as follows in accordance with the present invention. In a preferred embodiment, the communication system 100 comprises a time division multiple access (TDMA) communication system, such as the "iDEN" system that is commercially available from Motorola, Inc. Accordingly, the radio communication resource 102 preferably comprises a time division multiplex (TDM) time slot. The processor 108 determines whether the communication resource 102 is idle. Preferably, an information source (not shown) is coupled to the processor 108 that provides the processor 108 with information for each time slot. The absence of information to be conveyed via communication resource 102 indicates to the processor 108 that communication resource 102 is idle.

When a communication resource is idle, as communication resource 102 is determined to be, the processor 108 of base site 104 retrieves the set of one or more system parameters from the memory 110 and generates a pseudo-random signal based on the set of one or more system parameters. Preferably, the set of system parameters includes a so-called slot number that identifies the current time slot (i.e., communication resource 102) and a so-called color code that identifies the current base site (i.e., base site 104). The color code of base site 104 serves to differentiate base site 104 from other base sites which transmit on the same frequency as base site 104 and whose coverage areas overlap the coverage area of base site 104. Upon generating the pseudo-random signal, the processor 108 provides the pseudo-random signal to the transmitter 106. The transmitter 106, then, transmits the pseudo-random signal via the idle communication resource 102.

Receiver 114 of communication unit 112, receives the pseudo-random signal from the base site 104 via communication resource 102. Processor 116 of communication unit 112, retrieves a set of one or more system parameters from the memory 118 and generates a second pseudo-random signal based on the set of one or more system parameters. The set of system parameters from the memory 118 is the same as the set stored in memory 110 of the base site and, therefore, preferably includes the slot number of communication resource 102 and the color code of base site 104. Since the second pseudo-random signal was generated using the same system parameters as the pseudo-random signal generated by processor 108 of base site 104, the second pseudo-random signal is identical to the pseudo-random signal generated by processor 108.

Processor 116 compares the pseudo-random signal received by the receiver 114 (i.e., the received signal) to the second pseudo-random signal generated by the processor 116 (i.e., the expected signal). Processor 116, using methods discussed below, determines whether the received signal resembles the expected signal. When such a resemblance occurs, the processor 116 determines that communication resource 102 is an idle communication resource conveying an expected pseudo-random signal. Using the expected and received pseudo-random signals, the processor 116 preferably determines a time of arrival (TOA) for the received pseudo-random signal. Communication unit 112 can then use the TOA in combination with similar TOA information from other base sites (for triangulation, TOA from at least two other base sites are required) to determine the location of the communication unit 112. In an alternate embodiment, the processor 116 may use the expected and received pseudo-random signals to measure the signal quality of the received signal either instead of or in addition to determining location.

The transmission of known pseudo-random signals enables a communication system to perform location determination and signal quality measurements. By only transmitting such signals in idle time slots, as in the preferred embodiment, no reduction in system capacity or system performance results. Thus, the present invention provides a benefit to communication systems and avoids negatively impacting the system by utilizing system resources presently unused.

Figure 2:
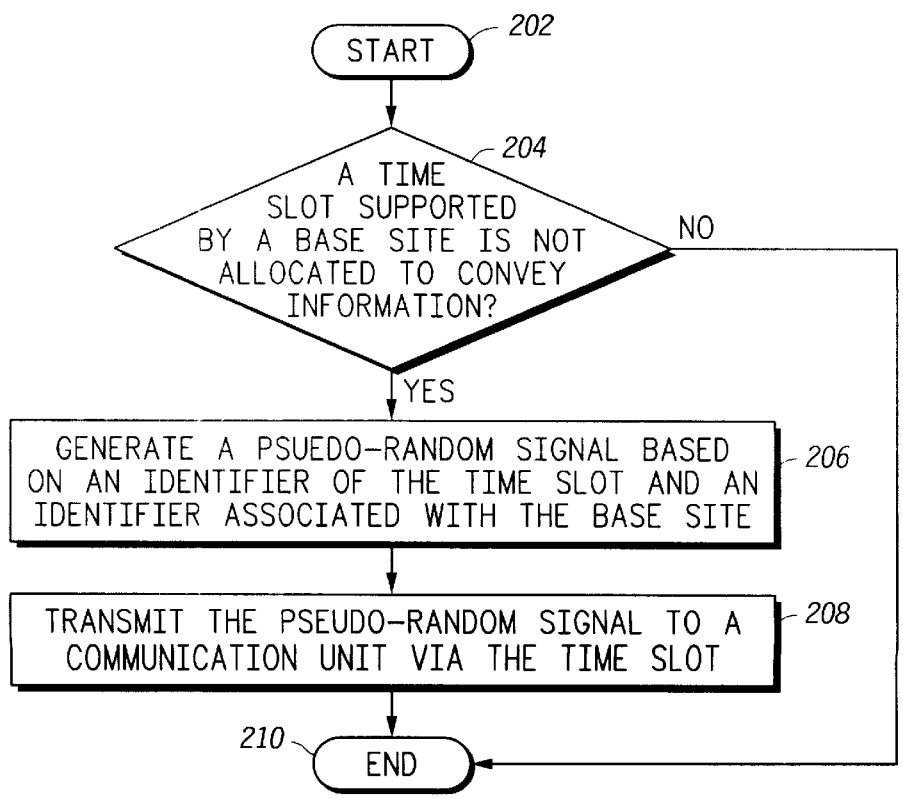
FIG. 2 illustrates a logic flow diagram of steps executed by a base site in accordance with a preferred embodiment of the present invention.

FIG. 2 illustrates a logic flow diagram 200 of steps executed by a base site in accordance with a preferred embodiment of the present invention. The logic flow begins (202) when the base site determines (204) that a communication resource supported by the base site is not allocated to convey information. The communication resource is, therefore, an idle communication resource and, preferably, an idle time slot. In a preferred embodiment, an idle time slot, while not allocated to convey information will actually convey some minimal control information such as the color code corresponding to the base site. Such control information is conveyed by every time slot, however, allocated or not.

To fill the idle time slot, the base site generates (206) a pseudo-random signal based on one or more system parameters. The pseudo-random signal is then transmitted (208) to one or more communication units via the idle time slot and the logic flow ends (210). In a preferred embodiment, the system parameters used are the slot number of the idle time slot and the color code of the base site. Both system parameters are known by all communication units receiving time slots from the base site. Thus, such communication units are able to generate the specific pseudo-random signal that will be transmitted via any idle time slot from the base site.

Pseudo-random signals for idle time slots are preferably generated as follows. The base site has a circular buffer filled with 47 16-bit numbers indexed 0 through 46. When generating a pseudo-random signal for an idle time slot, a starting index is calculated using the following expression:

starting index=$((1+C)(1+(S\%46)))\%47$ wherein:
  % represents a modulus operator;
  C represents the color code (ranging from 0 through 15 in the preferred embodiment) of the transmitting base site; and
  S represents the slot number (ranging from 0 through 30,239 in the preferred embodiment) of the idle time slot to be filled.

The 16-bit number whose index matches the starting index is the first number used to generate the pseudo-random signal. The remainder of the pseudo-random signal is generated using the 40 16-bit numbers whose indices follow the starting index consecutively in the circular buffer. In a preferred embodiment, both base sites and communication units have circular buffers filled with the same 47 16-bit numbers. Thus, a communication unit using the same color code and slot number as a base site will generate the same pseudo-random signal.

Figure 3:
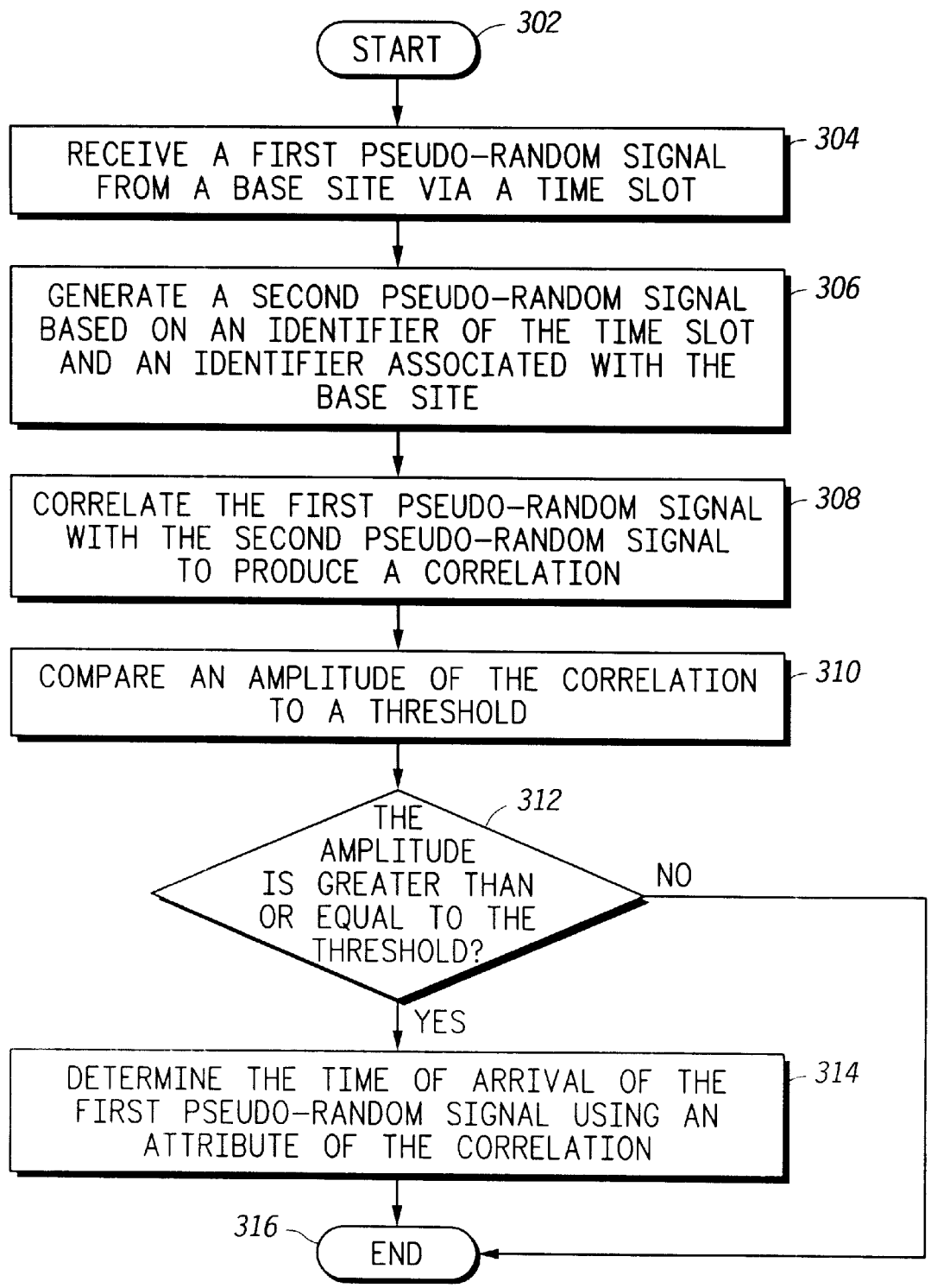
FIG. 3 illustrates a logic flow diagram of steps executed by a communication unit in accordance with a preferred embodiment of the present invention.

FIG. 3 illustrates a logic flow diagram 300 of steps executed by a communication unit in accordance with a preferred embodiment of the present invention. The logic flow begins (302) when the communication unit receives (304) a signal (i.e., a received signal) from a base site via a communication resource (preferably, a time slot). To determine whether the time slot is an idle time slot, the communication unit, preferably, generates (306) a pseudo-random signal based on the slot number of the time slot and the color code of the base site. The communication unit generates the pseudo-random signal as described above.

Upon generating the pseudo-random signal, the communication unit compares the received signal to the pseudo-random signal to determine whether the communication resource is an idle communication resource. Preferably, such a comparison is performed by correlating (308) the received signal to the pseudo-random signal. In the preferred embodiment, the received signal is demodulated, and the resulting demodulated symbols are then correlated with the pseudo-random signal generated by the communication unit. A symbol based correlator performs the correlation, thereby producing a correlation output.

Figure 4:
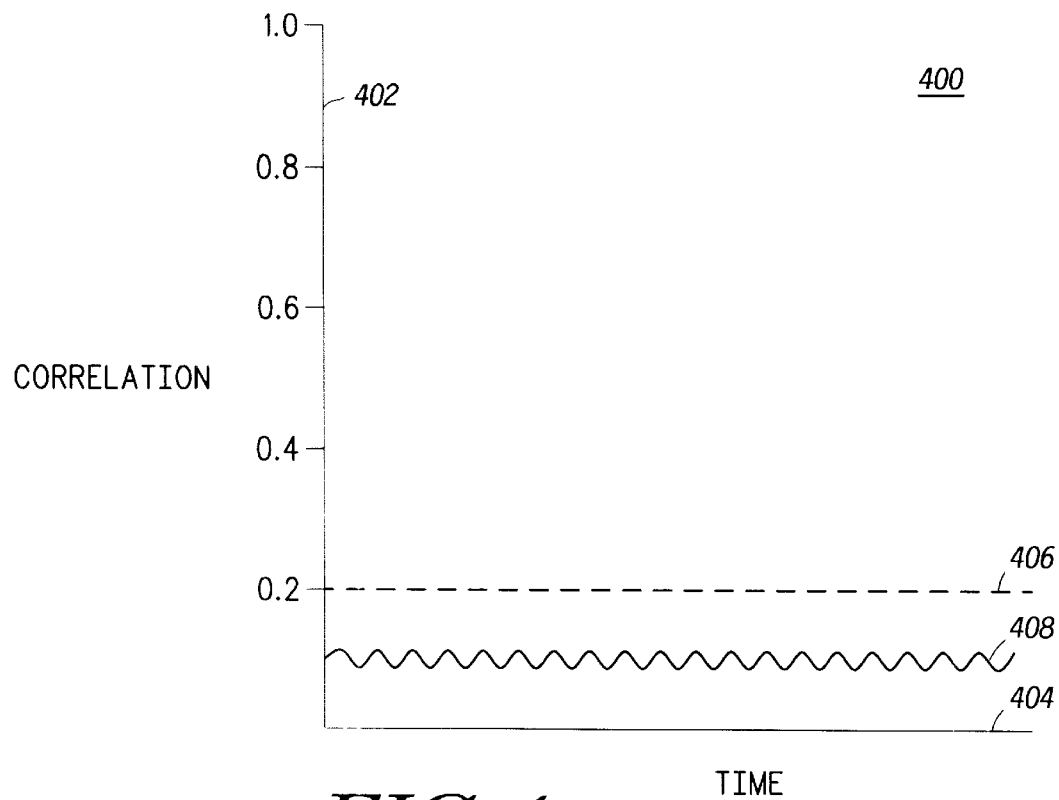
FIG. 4 illustrates a graph of a correlation of two signals determined in accordance with a preferred embodiment of the present invention.

FIG. 4 illustrates a possible correlation obtained when the received signal is correlated with the generated pseudo-random signal. Correlation values ranging from zero to one are mapped along the vertical axis 402, while time is mapped along the horizontal axis 404. Accordingly, correlation of the received signal to the generated pseudo-random signal as a function of time is shown by curve 408. A preferable correlation threshold of 0.2 is represented by the line 406. To determine whether the communication resource is an idle communication resource, the amplitude of the correlation is compared (310) to the correlation threshold. When (312) the amplitude of the correlation remains less than the correlation threshold, as depicted in graph 400, the communication resource is determined not to be an idle communication resource and the logic flow ends (316).

Figure 5:
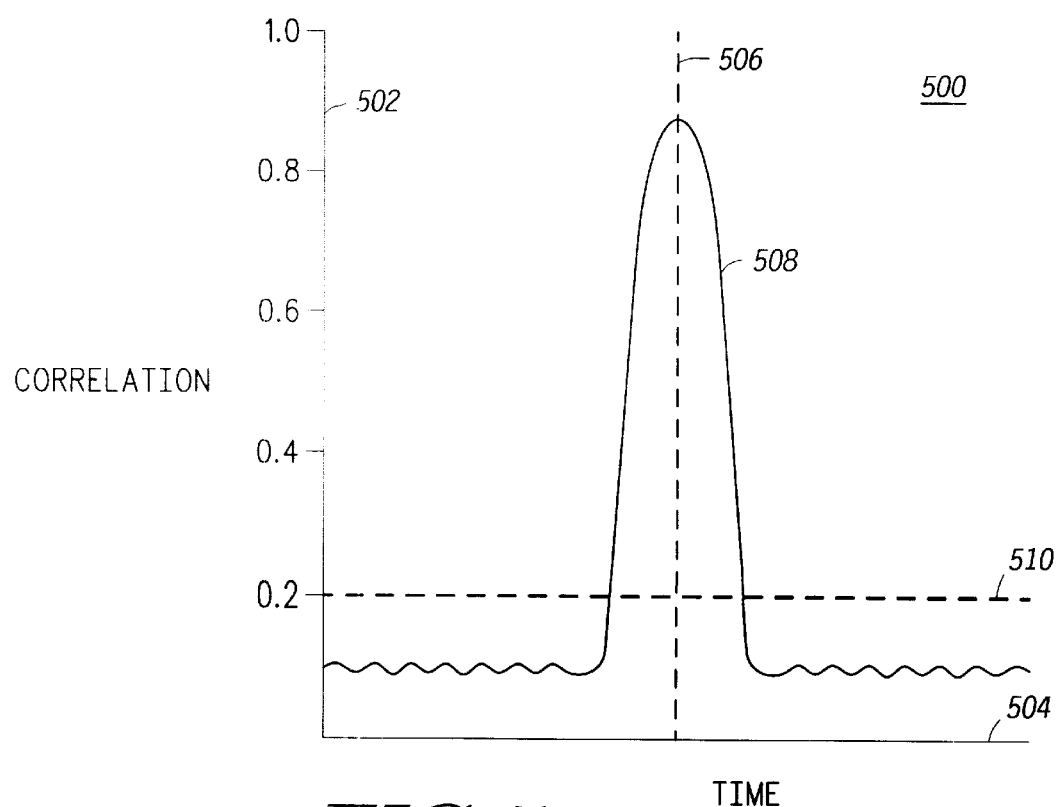
FIG. 5 illustrates a graph of a correlation of two signals determined in accordance with a preferred embodiment of the present invention.

Alternatively, FIG. 5 illustrates another possible correlation obtained when the received signal is correlated with the generated pseudo-random signal. Correlation values ranging from zero to one are mapped along the vertical axis 502, time is mapped along the horizontal axis 504, and the preferable correlation threshold of 0.2 is represented by the line 510. Curve 508 represents the correlation of the received signal to the generated pseudo-random signal as a function of time. Again, to determine whether the communication resource is an idle communication resource the amplitude of the correlation is compared (310) to the correlation threshold. In contrast to the amplitude of correlation curve 408, the amplitude of correlation curve 508 is greater than or equal to the correlation threshold (312) for a certain period of time. The received signal, therefore, correlates to the generated signal expected for an idle time slot. Thus, the received signal is the expected pseudo-random signal and the communication resource is, therefore, determined to be an idle communication resource.

In the preferred embodiment, when the communication resource is an idle communication resource, a time of arrival of the received pseudo-random signal is determined (314) using an attribute of the correlation. Preferably, the attribute of the correlation used to determine the time of arrival is the correlation peak. The time corresponding to the highest correlation amplitude, the correlation peak, is the time of arrival. Vertical line 506 of graph 500 intersects correlation curve 508 at the point of highest correlation amplitude. Accordingly, the intersection of line 506 with the time axis 504 denotes the time of arrival of the received pseudo-random signal. In the preferred embodiment, the time of arrival is determined using a differentiator filter. The correlation peak will correspond to a zero-crossing of the differentiated correlation function and, therefore, the time of arrival to the time of a zero crossing. Thus, time of arrival of a received pseudo-random signal can be determined by a communication unit.

In an alternate embodiment, when a communication resource is an idle communication resource, a signal quality measurement may be made instead, or in addition to, a time of arrival determination by a communication unit. When a communication resource is determined to be idle, the received pseudo-random signal can be compared to the expected pseudo-random signal (i.e., the generated pseudo-random signal) for the purpose of making signal quality measurements such as signal quality estimate (SQE). Thus, the signal quality of a received pseudo-random signal can also be determined by a communication unit.

The present invention encompasses a method and apparatus for using a pseudo-random signal to determine one or more characteristics of a communication resource within a communication system. The determination of characteristics such as time of arrival (used for location determination) and signal quality is based upon the receipt of a known or expected signal by a communication unit. With the present invention, known pseudo-random signals are received via idle communication resources. By using only idle communication resources in a communication system, the benefits of location and signal quality determination are achieved without the adverse effects of reduced system capacity or degraded communication service.

While the present invention has been particularly shown and described with reference to particular embodiments thereof, it will be understood by those skilled in the art that various changes in form and details may be made therein without departing from the spirit and scope of the present invention.

We claim:

1. A method for a communication unit to acquire a signal from a base site to enable the communication unit to determine a signal quality, the method comprising the steps of:

receiving a signal via a communication resource;
   determining whether the communication resource is an idle communication resource based on the signal;
   when the communication resource is an idle communication resource, determining a signal quality of the signal,
   wherein the step of determining whether the communication resource is an idle communication resource comprises the steps of:
   generating a second signal based on at least one system parameter known to both the base site and the communication unit; and
   comparing the signal with the second signal to determine whether the communication resource is an idle communication resource.

2. A method for a communication unit to acquire a signal from a base site to enable the communication unit to determine a time of arrival of the signal, the method comprising the steps of:

receiving a signal via a communication resource;
   determining whether the communication resource is an idle communication resource based on the signal;
   when the communication resource is an idle communication resource, determining a time of arrival of the signal,
   wherein the step of determining whether the communication resource is an idle communication resource comprises the steps of:
   generating a second signal based on at least one system parameter known to both the base site and the communication unit; and
   comparing the signal with the second signal to determine whether the communication resource is an idle communication resource.

3. The method of claim 2, wherein in signal is a psuedo-random signal.

4. The method of claim 2, wherein the communication resource is a time slot.

5. The method of claim 2, wherein the step of comparing comprises the step of correlating the signal with the second signal to produce a correlation.

6. The method of claim 5, wherein the step of determining the time of arrival comprises the step of determining the time of arrival of the signal using an attribute of the correlation.

7. The method of claim 6, wherein the attribute of the correlation is a peak of the correlation.

8. The method of claim 5, wherein the step of correlating further comprises the steps of:

comparing an amplitude of the correlation to a threshold; and when the amplitude is greater than or equal to the threshold, determining that the communication resource is an idle communication resource.

9. A communication unit comprising:

a receiver that receives a pseudo-random signal from a base site via a communication resource;

a processor, coupled to the receiver, that determines whether the communication resource is an idle communication resource based on the pseudo-random signal; and a memory, coupled to the processor, that contains at least one system parameter known to both the base site and the communication unit and wherein the processor further generates a second pseudo-random signal based on the at least one system parameter and compares the pseudo-random signal with the second pseudo-random signal to determine whether the communication resource is an idle communication resource.

10. The communication unit of claim 9, wherein the processor further determines a time of arrival of the pseudo-random signal when the communication resource is an idle communication resource.

11. The communication unit of claim 9, wherein the processor further determines a signal quality of the pseudo-random signal when the communication resource is an idle communication resource.

* * * * *